(No Model.) 2 Sheets—Sheet 2.

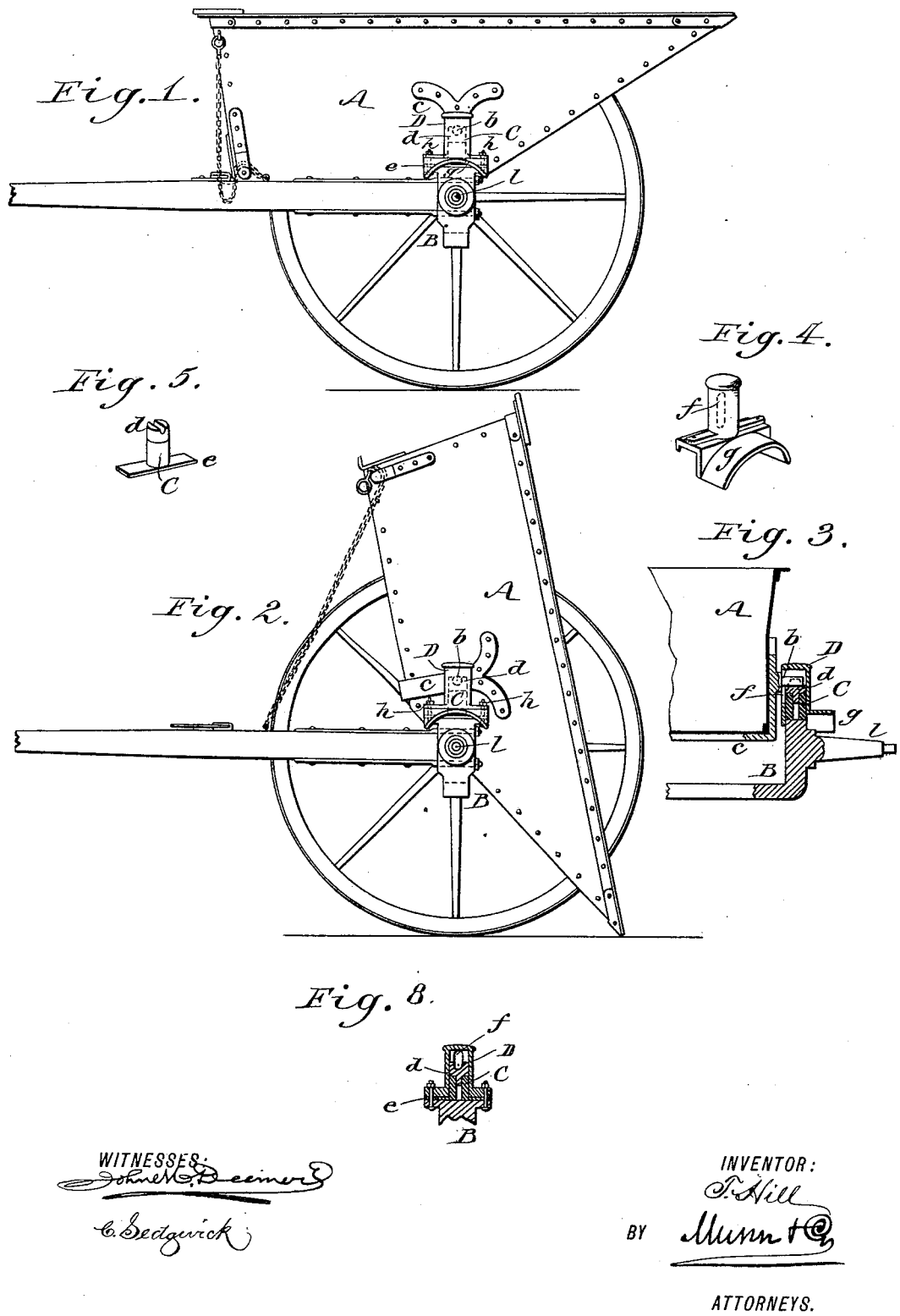

T. HILL.
DUMPING CART.

No. 405,777. Patented June 25, 1889.

WITNESSES:

INVENTOR
T. Hill
BY
ATTORNEY

UNITED STATES PATENT OFFICE.

THOMAS HILL, OF JERSEY CITY, NEW JERSEY.

DUMPING-CART.

SPECIFICATION forming part of Letters Patent No. 405,777, dated June 25, 1889.

Application filed January 19, 1889. Serial No. 296,896. (No model.) Patented in Canada October 13, 1888, No. 29,987.

*To all whom it may concern:*

Be it known that I, THOMAS HILL, of Jersey City, in the county of Hudson and State of New Jersey, have invented a new and useful Improvement in Dumping Carts or Wagons, (for which I have received Letters Patent of the Dominion of Canada, dated October 13, 1888, No. 29,987,) of which the following is a full, clear, and exact description.

This invention more particularly relates to dumping carts or wagons for common road and other like use, and the bodies of which are supported by side pivots or journals to provide for the tilting of them; and the invention consists in an elastic pedestal for said pivots or journals of special construction, substantially as hereinafter described, and pointed out in the claims.

Reference is to be had to the accompanying drawings, forming a part of this specification, in which similar letters of reference indicate corresponding parts in all the figures.

Figure 6:
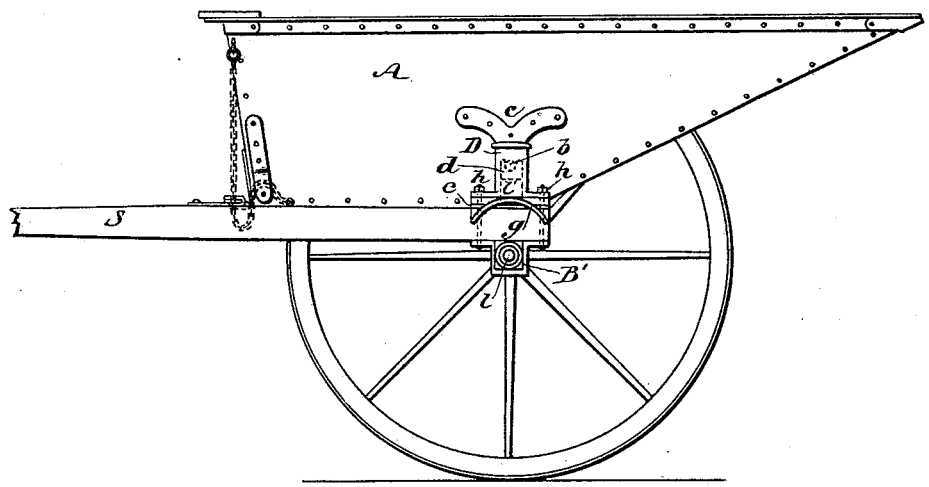
Figure 7:
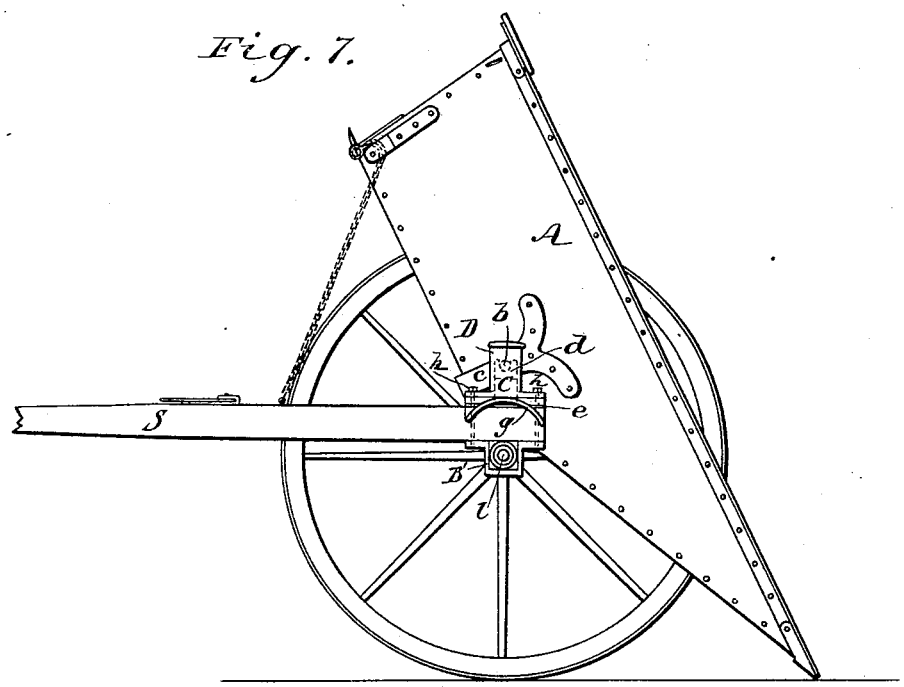

Figure 1 represents a side elevation of a dumping-cart embodying my invention, with one of the wheels of the vehicle removed and showing the cart as provided with a cranked axle. Fig. 2 is a similar view showing the body of the wagon in position as when dumping its load. Fig. 3 is a vertical transverse section in part of said cart, in illustration of a rubber pedestal with inclosing-box or upright in which the pivots or trunnions of the body of the cart are carried for the purpose not only of giving elasticity to the body, but to largely reduce the noise which usually attaches to the tilting body of dumping-carts having side pivots or trunnions. Fig. 4 is a perspective view of the box or upright which incloses said pedestal; Fig. 5, a perspective view of the rubber pedestal detached. Figs. 6 and 7 are similar views to Figs. 1 and 2, but showing the dumping-cart as provided with a straight axle and a different connection of the shafts of the vehicle with the axle; and Fig. 8 is a vertical section in a plane at right angles to Fig. 3 of the rubber pedestal and its box with axle in part.

Referring in the first instance more particularly to Figs. 1, 2, 3, 4, and 5 of the drawings, A is the body of the vehicle, preferably constructed of sheet metal and composed of a bottom, a sloping back, a front, and sides. Said vehicle-body is hung by opposite side pivots or trunnions $b$, one only of which is here shown, fast on a body-frame $c$ in specially-constructed bearings, substantially as hereinafter described, for the purpose of tilting the body as required. Thus mounted on each upright arm of the cranked axle B, carrying the arm 1, on which the vehicle-wheel turns, is an elastic vulcanized india-rubber pedestal C for either pivot or trunnion $b$ of the body, and which is composed of a cylindrical or other shaped upright body socketed to receive the shank of a metal bearing $d$ at its top, in which bearing the pivot $b$ rests, and constructed at its bottom with an extended flat base or foot-flange $e$, which rests upon a spread portion or seat on top of the axle. This rubber pedestal is inclosed within a metal box or upright D, shaped to receive snugly within it both the upright or body part of the elastic pedestal and the top and sides of the base or foot flange $e$. The upper or body part of said metal box D extends some distance above the elastic pedestal C and its pivot-bearing $d$, and is preferably closed at its top, but is provided on its inner side with a vertical slot $f$, through which the pivot or trunnion $b$ passes, and which provides for the up-and-down movement of said pivot as the elastic pedestal moves or yields. The lower portion of said metal box D, which fits over the upper end of the axle B, that the elastic pedestal C rests upon, has cast with or on it a mud-guard $g$, that serves to exclude mud or dirt, and the metal box or upright D, with its contained rubber pedestal, is firmly secured to the axle by bolts $h$. The metal box D, closed at its top, is open below to admit of the insertion of the spring or rubber pedestal with its bearing $d$ from beneath. By thus hanging the pivots of the body of the vehicle upon an upright or pedestal, which is composed of rubber and has an extended rubber base, not only is an easier running action obtained for the vehicle, but the noise so common to such pivoted bodies, and which is so objectionable, will be largely or wholly done away with.

In Figs. 6 and 7 of the drawings the same construction of an elastic support for the pivots of the tilting body of the vehicle is shown, including the rubber pedestal C and its inclosing-box D; but in these views said parts are represented as adapted to a dumping-cart having a straight axle B', instead of a cranked one, in which case said parts will be mounted and secured, as shown, by the bolts $h$ upon the top of either shaft S of the vehicle, instead of upon the top of the axle.

It should here be observed that the pivots or trunnions $b$ are arranged over and in the same center plane of gravity as the axle of the running wheels. By thus avoiding placing them either forwardly or in rear of the wheel's axle the body of the vehicle being so easily balanced will swing readily and discharge its load quickly. This arrangement, however, of the pivots of the body over the axle is not here claimed as new, as the same is to be found in other dumping-wagons—to wit, those described in Letters Patent issued to me August 21, 1883, No. 283,604; November 4, 1884, No. 307,546; October 13, 1885, No. 328,219, and November 1, 1887, No. 372,470, to all which, if desired, my improvement in the pedestal for the body pivots or trunnions herein described may be applied. In this pedestal the spring is inserted from the bottom, thereby largely lessening the cost, and the spring is thoroughly protected, being always inclosed and having no movable cap. By providing, too, the rubber springs or cushions C with base-flanges, as described, jar or noise is materially lessened.

The invention is also applicable to other vehicles, whether tilting or not, in which the bodies have side projections or pivots arranged to similarly rest upon springs.

Having thus described my invention, what I claim as new, and desire to secure by Letters Patent, is—

1. In a dumping-cart or other vehicle having its body carried by side pivots or projections, an elastic rubber pedestal for said pivots or projections composed of an upright body part and an extended yielding base or foot flange, substantially as specified.

2. In a vehicle, the elastic rubber pedestal C, having an extended base or foot flange $e$, in combination with the metal bearing $d$, having a socketed fit within said pedestal, essentially as described.

3. In vehicles having pivots on their bodies and spring supports or pedestals carrying the same, the metal box or upright D, constructed with a hollow body part closed on top but open below, essentially as described, whereby the spring-support or pedestal may be inserted from the bottom, as set forth.

4. In vehicles having side pivots on their bodies, the combination of the elastic rubber pedestal C, having a base-flange $e$, and the open-bottom metal box or upright D, having an extended base and adapted to receive within it from below and inclose said pedestal, substantially as specified.

5. In a spring-support for vehicles, the metal box D, adapted to contain the spring, and consisting of an upright body part open below but closed on top, an extended recessed flange-like base, and a mud-guard $g$, all integral with one another, essentially as shown and described.

6. The combination, with the body of the vehicle having side pivots or supports $b$, of the metal box D, open at its bottom, also having an opening $f$ in its inner face or side and a flange-like base, the rubber pedestal C, having an upright body part and extended base or foot flange $e$, the socketed metal bearing $d$, and the axle B or support carrying the metal box and contained pedestal, substantially as specified.

The foregoing specification of my new and improved dumping cart or wagon signed by me this 16th day of January, 1889.

THOMAS HILL.

Witnesses:
C. SEDGWICK,
EDW. M. CLARK.